United States Patent [19]

Mike et al.

[11] Patent Number: 5,634,293

[45] Date of Patent: Jun. 3, 1997

[54] ADHESIVE DEVICE FOR INSECT CAPTURE, SEALING AND HYGIENIC DISPOSAL

[76] Inventors: Andrew V. Mike; Joyce A. Mike, both of 380 NW. 67th St. Apt. 201, Boca Raton, Fla. 33487

[21] Appl. No.: 683,907

[22] Filed: Jul. 19, 1996

[51] Int. Cl.$^6$ .................................................. A01M 3/04
[52] U.S. Cl. .................................. 43/136; 43/137; 43/114
[58] Field of Search .............................. 43/114, 116, 136, 43/137; D22/124

[56] References Cited

U.S. PATENT DOCUMENTS

| | | | |
|---|---|---|---|
| 395,640 | 1/1889 | Thum | 43/114 |
| 813,196 | 2/1906 | Bien | 43/114 |
| 968,237 | 8/1910 | Dean | 43/116 |
| 1,459,711 | 6/1923 | Banks | 43/116 |

FOREIGN PATENT DOCUMENTS

| | | | |
|---|---|---|---|
| 196644 | 12/1906 | Germany | 43/116 |
| 242632 | 1/1912 | Germany | 43/116 |
| 449721 | 7/1936 | United Kingdom | 43/136 |

*Primary Examiner*—Jeanne Elpel
*Attorney, Agent, or Firm*—McHale & Slavin, P.A.

[57] ABSTRACT

An insect and pest disposal apparatus and method which includes a mounting apparatus which is loaded with an adhesive sheet of material which is used to capture and dispose of an insect. The mounting apparatus has a planar face and a aperture or slit penetrating through the face to the back of the apparatus. The adhesive sheet includes a first bisecting fold and a second and third parallel fold above and below the bisecting fold. The sheet is folded to form a gripping plane and a perpendicular adhesive plane. The gripping plane is inserted through the aperture, with the adhesive plane drawn flush against the mounting assembly face. Upon capturing an insect with the exposed adhesive material, the material sheet is pulled back through the assembly aperture, thereby causing the adhesive faces to fold inwards and seal the insect inside for hygienic disposal.

13 Claims, 2 Drawing Sheets

ADHESIVE DEVICE FOR INSECT CAPTURE, SEALING AND HYGIENIC DISPOSAL

FIELD OF THE INVENTION

This invention relates to an insect capturing, sealing and hygienic disposal device comprised of a uniquely folded adhesive paper which fits through an aperture or slit in a mounting assembly. The mounting assembly has an extension rod to allow contact and adhesive capture of the insect from a distance. As the captured insect is drawn through the mounting assembly aperture or slit, the paper folds over and seals for subsequent disposal.

BACKGROUND OF THE INVENTION

Crawling, flying, and pestilent insects are troublesome to catch and dispose of, particularly for individuals who are afraid of, or repulsed by, such creatures. Existing devices such as fly swatters are currently used to crush such insects. However, the messy carcass of the dead insect is left remaining on the walls and/or on the fly swatter. Prior art fly swatters are known to have used frontal adhesives, but the frontal planes of the fly swatter do not provide a readily available means of rapidly, effectively, and hygienically entombing and completely sealing the flying and crawling insects. Moreover, such devices also fail to adequately seal the exposed adhesive surfaces on the device after insect contact, adhesion, and sealing. This is necessary to prevent future coincidental adhesive contact with surrounding surfaces or objects, including the user of the device.

Another disadvantage of prior art devices is that insect contact is established on an essentially random basis, versus the will of an operator on an immediate need basis. Additionally, use of chemical insecticides in human habitats may be undesirable and may be harmful, either short or long term. This is particularly true in nurseries, and/or in the presence of the very ill or elderly. The present invention eliminates the need for chemical insecticides in human habitats where their use could be potentially harmful.

Adhesive technology exists today wherein the adhesive qualities can be modified to specifically address the user's requirements or desires. Additionally, pressure-sensitive adhesive papers or other materials are manufactured today at low unit-costs. Such papers might include the incorporation of complex or simple die-cuts and folds. Hence, what is needed is a device which utilizes such adhesive technology providing an operator means for selectively capturing and quickly disposing of an insect.

Still another disadvantage of the prior art which uses adhesive is that stationary insect traps such as fly paper can accumulate large numbers of insects. Such accumulated pests might carry diseases or pathogens which could present a health-hazard potential. These accumulated insects, either dead or alive, are exposed to human surroundings for possible air borne or physical contact by humans and pets.

A solution is needed which affords an operator a willful, portable means for quickly capturing and disposing of an insect in a hygienic and clean manner, even when an insect is at arms reach. This device can thereby incorporate an extension handle attached to a holder for an adhesive paper mounting device. Alternatively, a fixed location unit could also be provided which uses the same hygienic capturing and disposal system. The resulting portable or fixed device should allow for totally containing, sealing, and disposing of an insect in a fast, convenient and hygienic manner.

SUMMARY OF THE INVENTION

The present invention is an insect capturing, sealing and hygienic disposal device comprised of a uniquely folded and die-cut pressure-sensitive adhesive paper or other suitable material. The adhesive paper is folded and die cut for insertion through an aperture or slit located in the front or bottom of a mounting assembly. The folded adhesive paper forms two planes, namely: a frontal adhesive-covered plane comprised of two adjacent and equal areas that are parallel to said mounting assembly, and a gripping plane essentially perpendicular to said frontal adhesive-covered plane, the gripping plane extending from the frontal adhesive-covered plane through said aperture or slit. The gripping plane results in a handle-like tab for later extracting the adhesive paper back through the aperture or slit.

The upright, portable mounting assembly additionally provides an extension rod for hand-gripping to thereby extend the reach of the mounting device and its contained adhesive-covered plane. A fixed location embodiment would not need such a handle. The paper is held in position due to the narrow aperture or slit dimension as compared to the thickness of the folded paper, yet still allows free passage of the frontal or upright formed paper plane through the aperture or slit when desired.

As for the upright mounting assembly, an adhesive-covered front plane on the paper is then formed on the front side of the mounting by removal of two adjacent pre-positioned adhesive covering strips, whose removal is aided by pre-cuts. These cuts coincide with two folds which are located equi-distant, one above and one below, a center or bisecting fold of the adhesive paper assembly. The adhesive paper is then folded along the center or bisecting fold, and counter-folded perpendicularly along the equi-distant folds, to form a front plane and a perpendicular gripping plane. The tab handle formed from the gripping plane is inserted through the aperture or slit-length opening prior to removal of the adhesive-covering strips.

A fixed location device would have a box-like mounting assembly with a lid and a slit in its bottom. The box-like assembly would have various holes to allowing exploring insects to enter the interior of the assembly. The lid would be removed and an adhesive paper assembly similar to the one used with the portable device would be folded to form a tab handle. An upper plane formed by the bottom of the box-like assembly would have a slit along its length. The tab handle would be inserted through this slot, with the covered adhesive surfaces facing upwards. The adhesive-covering strips would then be removed, the assembly lid replaced, and the loaded assembly would be placed in an needed area. Insects could enter the fixed location device randomly, or they could be attracted to this device, as the adhesive material and/or mounting assembly might include a chemical or other attractant.

In operation, the exposed planar adhesive area of the portable device is positioned over and brought into contact with an insect. With the fixed device, the insects will enter the assembly and walk upon or fly into the adhesive area. Positive contact with the adhesive plane causes the insect to adhere to the adhesive paper. Withdrawal or pulling of the handle tab on the reverse side of the adhesive frontal or upper plane causes both upper and lower adhesive members to make contact with one another. The upper and lower adhesive members thereby join together and seal or bond, forming a single planar unit with the insect being entombed inside. The insect is three-dimensionally sealed within the two adhesive members for immediate hygienic disposal. The aperture or slit in the mounting assembly might also be formed as opposing flaps, or with multiple vertical slits, so that the larger trapped insect can be drawn back through the aperture or slit with minimal resistance.

As a result, the operator need not directly contact the insect during the entire operation of forming, preparing, engaging, sealing, and removing the adhesive paper with its insect-containing contents from the device.

Accordingly, it is an object of the present invention to provide an apparatus and method for convenient and hygienic capturing and disposing of an insect.

It is a related object of the present invention to provide a handled mounting assembly with a planar, slitted front surface aperture, and an adhesive paper which is folded to form a frontal plane and a perpendicular gripping plane, with the gripping plane receivable held by the aperture.

It is still a related object of the present invention to provide the adhesive paper as formed above with covering strips over the adhesive surfaces, the strips being conveniently removed before operation of the device to capture and dispose of an insect.

It is yet another object of the present invention to provide the mounting assembly as formed above with opposing flap-like members thereby creating a variable aperture slit for extracting larger insects through the planar face of the assembly.

It is still another object of the present invention to provide a fixed location mounting assembly with a slit for receiving an adhesive paper as formed above, whereby the insects randomly enter or are attracted to and enter the assembly, and the paper is hygienically extracted through the slit when full.

It is a further object of the present invention to provide a method of using the apparatus whereby the adhesive paper is folded and loaded into the mounting assembly aperture or slit, the covering strips are removed, the insect is captured and adhered to the planar face, and the paper is extracted back through the mounting assembly via the gripping tab to thereby seal the insect within the enclosure formed by the upper and lower planar halves which meet and seal around their adhesive faced edges.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
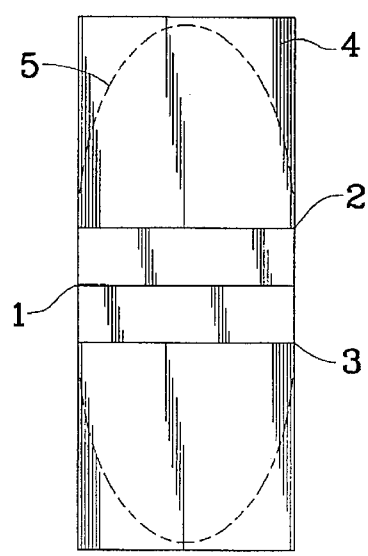
FIG. 1 shows a perspective front view of the adhesive paper and cover panels with the appropriate folds for mounting the formed device in the mounting assembly aperture or slit.

Referring now to FIG. 1, a perspective front view of the adhesive paper section is shown. The preferred embodiment uses an circular or oval-shaped adhesive paper 5 which is protected from exposure by square sections 4. The adhesive protective sections 4 can also be oval or circular to exactly match up with the shape of the adhesive paper 5. As shown, a center or bisecting fold 1 and two equi-distant parallel folds 2 and 3, above and below the center, are formed in the paper. The paper shown is flat as it would typically come from a package of refills for the device, prior to its planar mounting, and prior to folding and removing its adhesive-protective or covering panels. Each adhesive paper is comprised of an upper and lower half, with each adhesive section protected by a separate die-cut rectangular, semi-circular, or other shaped adhesive covering strip 4 covering a hidden adhesive-coated layer of paper or other suitable material 5.

To form the adhesive paper for use, fold 1 is formed followed by the folding of 2 and 3 in opposite direction to the folding of 1. Fold 1 is folded in the direction that will position the adhesive paper 5 to be on the same side as fold 1 when 1, 2 and 3 are folded as shown. The adhesive substance and covering strip 4 will face in the opposite direction of the fold 1. Fold 1 is a fold only, with no die-cut. Folds 2 and 3 are folds that are die-cut along their entire fold length, but only die-cut on covering surface 4, the adhesive protective coating surface, to accommodate peel-away of the adhesive coating strips or panels to expose the adhesive on material 5.

Figure 2:
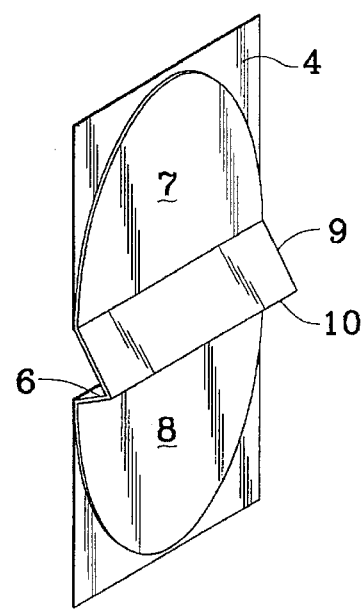
FIG. 2 shows a perspective rear view of the adhesive paper in the process of being folded to form the upper and lower front planar halves and the perpendicular gripping plane and handle tab.

FIG. 2 shows a perspective rear or back view of the adhesive paper section with folds 1, 2 and 3. The adhesive-covering panels or strips 4 have not yet been removed. A gripping plane 6 has been partially formed by sections 9 and 10, with the non-adhesive sides of the device 7, 8, 9 and 10 being shown.

Figure 3:
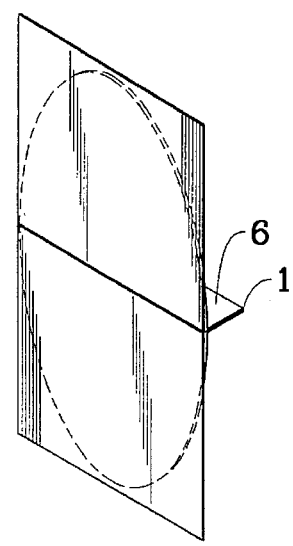
FIG. 3 shows a perspective front view of FIG. 2 with the adhesive paper fully folded to form the upper and lower front planar halves and the perpendicular gripping plane and handle tab.
Figure 4:
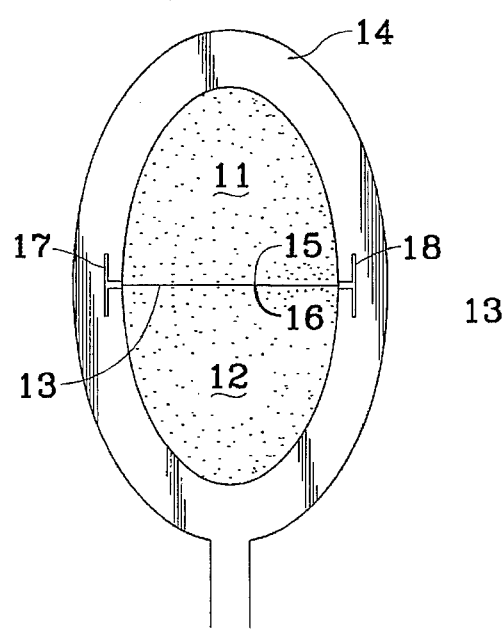
FIG. 4 shows a perspective front view of the mounting assembly with the folded adhesive paper inserted into the receiving aperture or slit, and the adhesive covering panels removed to thereby expose the adhesive paper.
Figure 5:
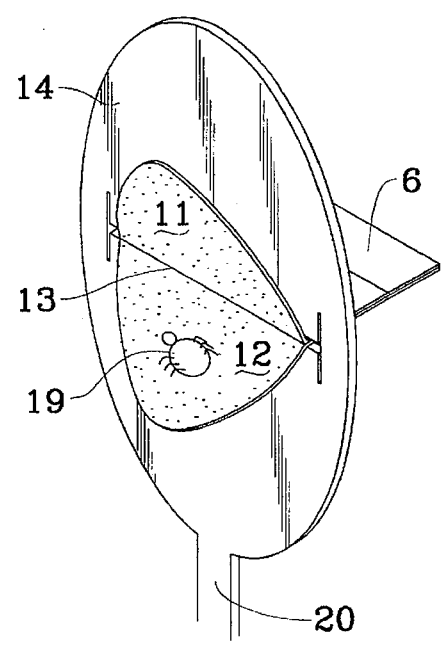
FIG. 5 shows the exposed adhesive paper device being partially pulled through the mounting assembly aperture or slit, with an insect adhering to one of the adhesive surfaces.

Referring now to FIG. 3, a perspective front view of FIG. 2 is shown with the adhesive-covering panels 4 not yet removed as in FIG. 2, and the gripping plane being essentially formed and ready for insertion into the narrow aperture or slit 13 of the mounting as shown in FIGS. 4 and 5.

Figure 8:
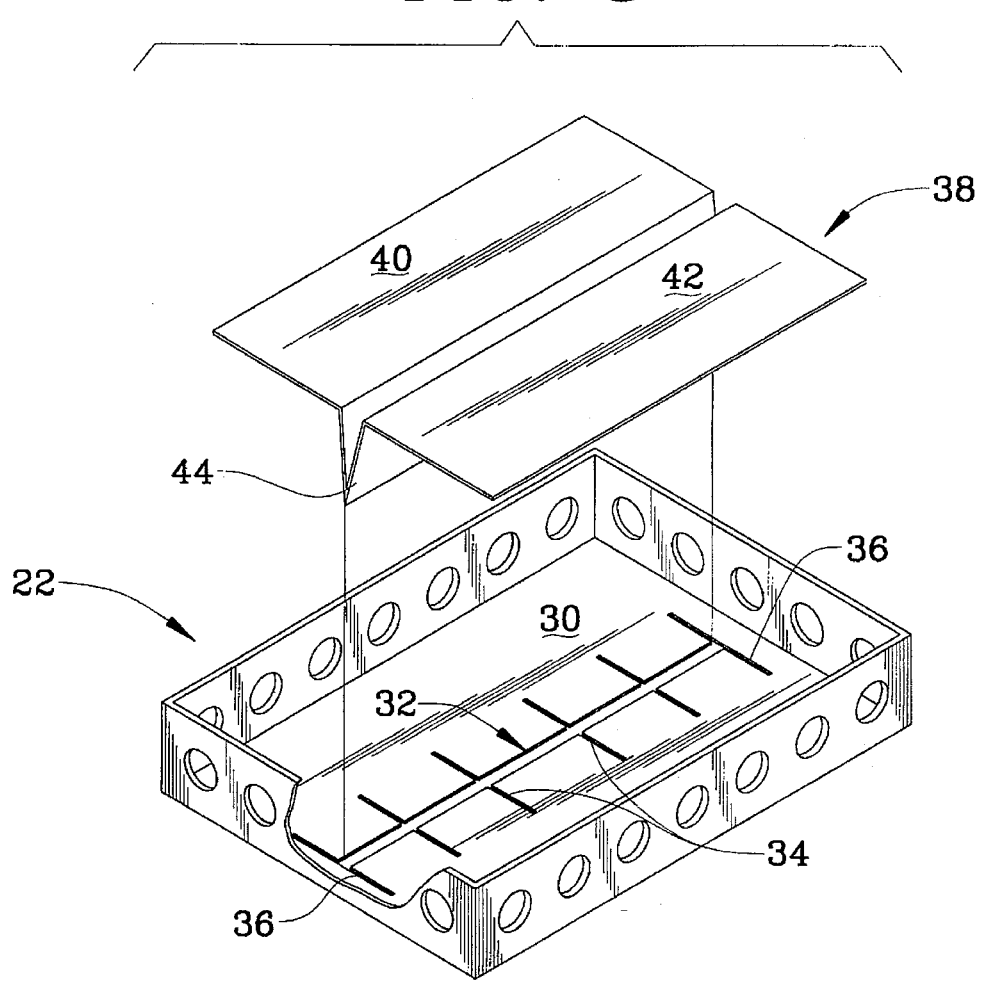
FIG. 8 shows a top view of the fixed location mounting assembly of FIG. 7, with the lid removed and a folded adhesive paper prepared for insertion into the slit in the bottom of the assembly.

Referring now to FIG. 4, a perspective front view of the present invention is shown. The mounting assembly 14 is shown with the two adhesive and adjacent upper and lower frontal planes 11 and 12 exposed, forming a continuous plane of adhesive substrate parallel to the mounting assembly face. The adhesive material is held in position by the formed gripping plane 6, or handle tab, that is extended through the length of slit or aperture 13 on the mounting shown in FIG. 4 and FIG. 5. As shown, the aperture or slit 13 is formed from an upper flap 15 and lower flap 16 resulting from the vertical side slits 17 and 18. The flap construction allows some variability as to the size of the slot opening for removing larger insects. Variability could be accomplished by lengthening and/or adding more side slits, as shown in FIG. 8 described below.

Referring now to FIG. 5, an insect 19 is shown trapped on the adhesive front surface 12 of the device. The folded adhesive paper device is shown being partially pulled through the aperture or slit 13. The user grips the gripping plane or handle tab 6 and pulls backwards from the rear of the assembly 14. This causes the upper and lower sections 11 and 12 to fold in towards each other and thereby entrap and three-dimensionally seal the insect 19. Surfaces 11 and 12 seal against each other due to the adhesive coating which initially entrapped the insect. This adhesive quality is then used to seal and entomb the insect in the withdrawn adhesive device. The mounting assembly 14 also has a handle extension 20 to allow the user to entrap insects from a distance.

Figure 6:
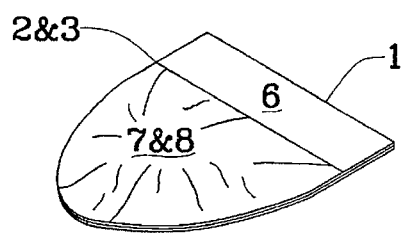
FIG. 6 shows the sealed adhesive paper device as totally withdrawn or pulled through the mounting assembly aperture or slit and sealed, with all adhesive surfaces being enjoined to form a single sealed unit containing the entombed insect.

Referring now to FIG. 6, the sealed adhesive device is shown totally withdrawn or pulled through the mounting aperture or slit 13. The device is sealed with all adhesive surfaces being enjoined to form a single sealed unit containing the insect, the insect being completely isolated and entombed. As such, the non-adhesive sides of the paper 7 and 8 are exposed, with the gripping plane 6 and the resultant folds 1, 2, and 3 as shown.

Figure 7:
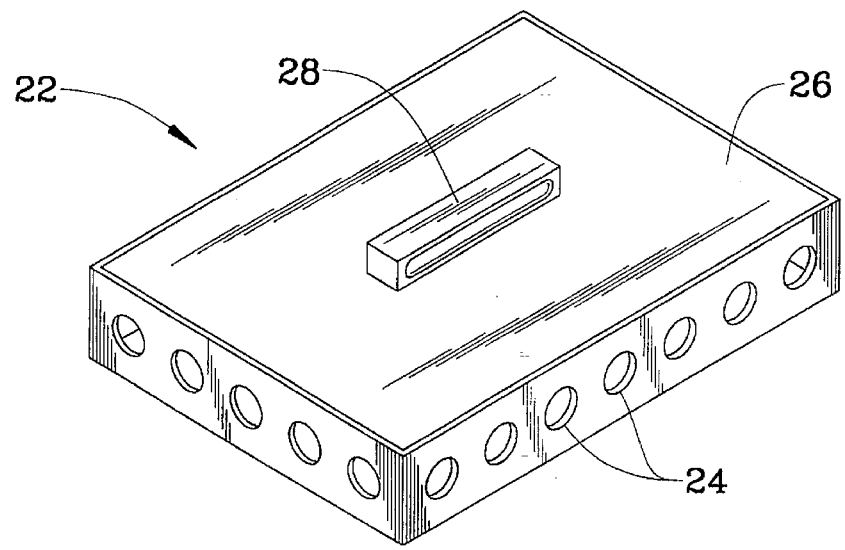
FIG. 7 shows a perspective view of a fixed location mounting assembly.

FIG. 7 shows a perspective view of a fixed location mounting assembly device 22 with a box-like structure. The sides of the structure include a plurality of holes or openings 24 to allow an insect to enter the assembly. A lid 26 with a handle or handle slot 28 is removably placed over the top of the assembly 22.

Referring now to FIG. 8, a top view of the assembly 22 with the lid removed is shown. The bottom 30 of assembly 22 presents an upward facing plane which has a horizontal slit 32 running along its length. In this instance the horizontal slit 32 has a plurality of vertical slits 34 and side slits 36 to allow variable opening of the slit 32. Also shown is a folded adhesive paper 38 forming an upper section 40 and a lower section 42 and a gripping tab handle 44. As similar to the portable device described above, the tab 44 is inserted into the slit 32 to bring the adhesive planar surfaces 40, 42 into planar contact with the bottom plane 30. To facilitate placing the loaded assembly 22 on the ground or other surface, the flexible tab 44 would be folded over flat against the bottom of the assembly 22. Any protective covering strips over sections 40, 42 would be removed and the lid 26 would be replaced. The fixed location device 22 would then be placed in an area needing removal of infestation and/or the occasional unwanted insect.

Being a "hands off" device, the surface areas of adhesive sections 40, 42 would probably be larger than for the portable device. Also an attractant might need to be added, chemical or otherwise, to the adhesive material and/or mounting apparatus in order to draw insects into adhesive contact. Given that the device will be left unattended for a period of time, a larger amount of insects might be allowed to adhere to the paper before hygienically extracting and changing out the adhesive paper.

The method for use would then consist of the following operational steps. A user would remove a new sheet of adhesive material from a replacement or refill package either supplied with the device, or purchased separately. The folds 1, 2, and 3 are formed by the user to form the gripping handle tab and perpendicular adhesive faces. The user might also acquire the adhesive paper device in a pre-folded condition. For the hand-held device, the user then inserts the device shown in FIGS. 1–3 through the aperture or slit 13 found on FIGS. 4 and 5, with the slit holding the device in position. Similarly, for the fixed location device, the user inserts the adhesive device 38 shown in FIG. 7 through the aperture or slit 32 in FIG. 8.

Prior to immediate use, the adhesive-covering 4 is then removed from the device which creates a split, yet continuous plane of exposed adhesive parallel to the mounting. Such covering is not shown as an element in FIG. 8, but exists over the adhesive sections 40, 42 of the device 38, either exactly conforming in shape or being oversized to facilitate removal. With the hand-held mounting assembly device 14, an operator then contacts an insect with the adhesive planes 11 and 12 of the device, and pulls the gripping plane 6 through the narrow aperture or slit 13 which seals the insect by joining and sealing the adhesive planes 11 and 12. The sealed packet of FIG. 6 is thereby formed for disposal of the entombed and completely sealed insect.

Similarly for the fixed location device 22 of FIGS. 7 and 8, insects would contact and adhere with the adhesive planes 40 and 42 of the device. The user then pulls the gripping plane or handle tab 44, back through the aperture or slit 32 which seals the insect by joining and sealing the adhesive planes 40 and 42. This larger sealed packet, not shown, is also ready for disposal of the entombed and three-dimensionally sealed insects.

The hand-held, or portable, embodiment shown has a mounting assembly which is generally circular or oval in shape with a horizontal aperture or slit across its face. The adhesive material or paper is also circular or oval in shade and has square or oval or circular protective covering sections. Such mounting assembly and adhesive material shapes are for example purposes only. The features of the described invention could be accomplished using any of a variety of mounting assembly shapes, adhesive paper shapes, and/or covering section shapes. Such shapes might include decorative flowers or plants. Alternatively insect or animal shapes might be used. The adhesive paper could also carry decorative prints of flowers and the like which correspond with the shapes and colors of the particular mounting assembly. Such floral and/or natural-like shapes and colors, while aesthetically pleasing, might also possibly aid in the capture of the insect on a random basis or when the mounting assembly is moved over and towards the fleeing pest.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. An insect and pest disposal apparatus comprising:
   a mounting assembly with a front and back face, said front face being substantially planar having an aperture extending to said back face; and
   a disposable sheet of material having an adhesively coated first side and a non-coated opposite side, said first side having a removable protective covering sheet, said disposable sheet having a first bisecting fold and second and third equi-distant parallel fold above and below said bisecting fold;

wherein said material sheet is folded along its bisecting fold in the direction away from said first side, said second and third folds being folded in the opposite direction to form an upper and lower section of a perpendicular plane of adhesively faced material, said folds thereby forming a first gripping plane and a perpendicular frontal adhesive plane, said gripping plane being inserted through and receivably held by said aperture in said frontal face of said assembly.

2. The insect and pest disposal apparatus of claim 1, wherein said aperture is formed by the joinder of at least one upper and lower flexible flap formed by at least a pair of vertically oriented slits intersecting with said aperture.

3. The insect and pest disposal apparatus of claim 1, wherein said mounting assembly includes an extension handle.

4. The insect and pest disposal apparatus of claim 1, wherein said mounting assembly and adhesive sheets are formed in the shapes of flowers whereby said insects and pests are attracted to said shapes.

5. A method for utilizing the insect and pest disposal apparatus of claim 1, including the following steps:

folding said adhesive sheet along said bisecting fold so that said first adhesive sides face inwards and form said first gripping plane;

folding said adhesive sheet in the opposite direction along said second and third parallel folds to form a second plane which is perpendicular to said gripping plane and whose protectively covered adhesive side faces in the direction away from said bisecting fold;

inserting said gripping plane through said aperture so that said second plane is flush against said mounting assembly face and said gripping plane protrudes out said back of said mounting assembly;

removing said protective covering from said adhesive faces;

bring said exposed adhesive faces in contact with an insect which thereby adheres to the adhesive material;

pulling backwards on said gripping plane to thereby draw said adhesive faces of said upper and lower planes in towards each other as they pass through said aperture to sealably close around said trapped insect;

fully withdrawing said adhesive sheet, which foldably entombs said trapped insect, and disposing of the hygienically sealed package.

6. An insect and pest disposal apparatus comprising:

a mounting assembly with an internal volume and a removable lid, said volume including a bottom with an upper and lower face, said upper face being substantially planar having an aperture extending to said lower face; and a disposable sheet of material having an adhesively coated first side and a non-coated opposite side, said first side having a removable protective covering sheet, said disposable sheet having a first bisecting fold and second and third equi-distant parallel fold adjacent said bisecting fold;

wherein said material sheet is folded along its bisecting fold in the direction away from said first side, said second and third folds being folded in the opposite direction to form opposing sections of a perpendicular plane of adhesively faced material, said folds thereby forming a first gripping plane and a perpendicular adhesive plane, said gripping plane being inserted through and receivably held by said aperture against said upper face of said assembly.

7. The insect and pest disposal apparatus of claim 6, wherein said aperture is formed by the joinder of at least one pair of corresponding flexible flaps formed by at least a pair of slits intersecting with said aperture.

8. The insect and pest disposal apparatus of claim 6, wherein said adhesive material or mounting assembly includes an insect attractant.

9. A method for utilizing the insect and pest disposal apparatus of claim 6, including the following steps:

folding said adhesive sheet along said bisecting fold so that said first adhesive sides face upwards and form said first gripping plane;

folding said adhesive sheet in the opposite direction along said second and third parallel folds to form a second plane which is perpendicular to said gripping plane and whose protectively covered adhesive side faces in the direction away from said bisecting fold;

inserting said gripping plane through said aperture so that said second plane is flush against said mounting assembly upper face and said gripping plane foldably protrudes out said lower face of said mounting assembly bottom;

removing said protective covering from said adhesive faces;

placing said mounting assembly in a location to allow said exposed adhesive faces to come in contact with insects which thereby adhere to the adhesive material;

lifting said mounting assembly and pulling downwards on said gripping plane to thereby draw said adhesive faces of said upper and lower planes in towards each other as they pass through said aperture to sealably close around said trapped insects;

fully withdrawing said adhesive sheet, which foldably entombs said trapped insect, and disposing of the hygienically sealed package.

10. An insect and pest disposal apparatus comprising a mounting assembly and a disposal adhesive material sheet with an adhesive face, said adhesive material sheet folded and inserted into a penetrating aperture slot in said mounting assembly so that said adhesive face of said adhesive material sheet is exposed to adhesively capture at least one insect or pest, said adhesive material sheet and insect then being drawn through said penetrating aperture slot to sealably entomb said insect.

11. The insect and pest disposal apparatus of claim 10, wherein said aperture is formed by the joinder of at least one upper and lower flexible flap as formed by at least a pair of vertically oriented slits intersecting said aperture.

12. The insect and pest disposal apparatus of claim 11, wherein said adhesive material sheet includes a first bisecting fold and a second and third parallel fold above and below said bisecting fold, whereby a gripping plane and perpendicular adhesive plane with perpendicular faces are formed by opposite folds.

13. The insect and pest disposal apparatus of claim 12, wherein said gripping plane is inserted through said aperture and pulled to draw said perpendicular faces in towards each other as they pass through said aperture.

* * * * *